United States Patent [19]
Thayamballi et al.

[11] Patent Number: 5,818,685
[45] Date of Patent: Oct. 6, 1998

[54] CIP GMR SENSOR COUPLED TO BIASING MAGNET WITH SPACER THEREBETWEEN

[75] Inventors: Pradeep K. Thayamballi, Fremont; Samuel W. Yuan, San Carlos, both of Calif.

[73] Assignee: Read-Rite Corporation, Milpitas, Calif.

[21] Appl. No.: 851,265

[22] Filed: May 5, 1997

[51] Int. Cl.⁶ ...................................................... G11B 5/39
[52] U.S. Cl. ............................................................ 360/113
[58] Field of Search .............................................. 360/113

[56] References Cited

U.S. PATENT DOCUMENTS

| | | | |
|---|---|---|---|
| 4,623,867 | 11/1986 | Lundquist et al. | 360/113 |
| 5,287,238 | 2/1994 | Baumgart et al. | 360/113 |
| 5,532,892 | 7/1996 | Nix et al. | 360/113 |
| 5,576,914 | 11/1996 | Rottmayer et al. | 360/113 |
| 5,608,593 | 3/1997 | Kim et al. | 360/113 |
| 5,668,686 | 9/1997 | Shouji et al. | 360/113 |

*Primary Examiner*—Craig A. Renner
*Attorney, Agent, or Firm*—Nathan N. Kallman

[57] ABSTRACT

A magnetic thin film head employing giant magnetoresistance (GMR) includes alternating layers of ferromagnetic material and nonmagnetic material coupled by magnetostatic and exchange interactions to produce an antiparallel orientation between the magnetic layers in the absence of an external field. Magnetic biasing is applied by a permanent magnet to the alternating layers to obtain a scissor-like configuration of the adjacent magnetic layers. The magnet is placed in contiguous junction with the multilayered GMR structure edge which is away from the air bearing surface, and is separated from the sensor by a nonmagnetic, nonconductive spacer.

4 Claims, 2 Drawing Sheets

5,818,685

CIP GMR SENSOR COUPLED TO BIASING MAGNET WITH SPACER THEREBETWEEN

CROSS-REFERENCE TO RELATED PATENT

U.S. Pat. No. 5,576,914 entitled "Compact Read/Write Head Having Biased GMR Element", issued Nov. 19, 1996 to Rottmayer et al., and assigned to the same assignee as the present application, discloses a biased giant magnetoresistive (GMR) transducer. The subject matter of that patent is related to the present application and is incorporated herein by reference.

FIELD OF THE INVENTION

This invention relates to thin film magnetic heads employing the giant magnetoresistive effect, and relates particularly to such heads employing permanent magnets to effect biasing of the structure.

DESCRIPTION OF THE PRIOR ART

The prior art discloses magnetic read transducers referred to as magnetoresistive (MR) sensors or heads which are capable of reading data from magnetic media at high linear densities. An MR sensor detects magnetic field signals by means of resistance changes in an MR read element as a function of the strength and direction of magnetic flux being sensed by the read element. These prior art MR sensors operate on the basis of the anisotropic magnetoresistive (AMR) effect in which a component of the read element resistance varies as the square of the cosine of the angle between the magnetization direction and the direction of sense current flow through the read element.

A more pronounced magnetoresistive effect has been described, in which the change in resistance of a layered magnetic sensor is attributed to the spin-dependent transmission of the conduction electrons between the magnetic layers through a nonmagnetic layer, and the accompanying spin-dependent scattering at the layer interfaces. This magnetoresistive effect is usually referred to as "giant magnetoresistance" (GMR). Such a magnetoresistive sensor fabricated of the appropriate materials provides improved sensitivity and greater change of resistance than is observed in sensors utilizing the AMR effect. In this GMR type of sensor, the in-plane resistance between a pair of ferromagnetic layers separated by a nonmagnetic layer varies as the cosine of the angle between the magnetizations in the two layers. U.S. Pat. No. 5,206,590, Dieny et al, shows examples of such GMR structures.

In accordance with the invention of the above-identified U.S. Pat. No. 5,576,914, a compact read/write head includes a magnetically biased GMR element which provides reduced noise in the read signal and improves the linearity and gain of flux sensing. The GMR element is magnetically biased such that the major domains of alternate layers of the GMR element define a scissors-type configuration when no excitation field is supplied by an adjacent record medium. When an excitation field is supplied by the adjacent record medium, it rotates the scissors configuration from a crossed (90°) state towards either a closed (0°) state or an antiparallel (180°) state, depending on the polarity of the excitation field. The resultant change in cosine (and resistance of the GMR element, which is a function of cosine) is therefore from zero (Cos 90°) to a positive one (Cos 0°) or to a negative one (Cos 180°).

U.S. Pat. No. 4,524,401 Uchida et al, shows an MR head employing a biasing magnet located coplanar with the MR sensor and away from the air bearing surface (ABS) of the head. The biasing magnet generates a demagnetizing field which is relatively intense in the MR sensor region near the ABS (along the MR stripe height direction), and less intense in the sensor region away from the ABS. The bias magnetic field generated from the biasing magnet is of a strength to saturate the central portions of the MR element away from the ABS, while the region of the MR near the ABS remains sensitive to the signal field from the recorded track of the magnetic recording medium. Uchida et al. deal with single layer structures, rather than the multilayer structures proposed in the present invention.

SUMMARY OF THE PRESENT INVENTION

To use multilayer GMR sensors in magnetic recording readback, it is desirable to have a linear response of the electrical readback signal relative to the applied magnetic field. Since the electrical signal is proportional to the cosine of the angle between the directions of magnetization of the adjacent magnetic layers, a biased state needs to be created, about which the field excitations of the magnetic medium, such as a magnetic disk, produce a linear output signal. If the biased magnetizations are in such an orientation that the external field from the medium is in a direction bisecting the angle between the magnetizations in alternate layers, the resistance of the layers changes in a linear fashion with reference to the external field. Structure for creating the biased state in which the magnetizations in the alternate layers are at right angles to each other is provided in accordance with this invention.

In the present invention, layers of ferromagnetic material are interleaved with layers of nonmagnetic material so that magnetization in the layers is coupled by magnetostatic interactions therebetween and by any exchange interactions between the layers, to provide an antiparallel orientation between the layers. A biasing permanent magnet is placed in contiguous junction with the multilayer GMR structure edge which is away from the ABS. The purpose of this biasing magnet is to set the GMR multilayer magnetizations into a scissored state in order to obtain maximum response sensivity, rather than to saturate the sensor central portions as in the Uchida et al structure. A contiguous junction fabrication technique for the bias magnet is used to achieve a close proximity between the multilayer GMR sensor element and the biasing magnet, which is critical for an operational device with a small read gap.

DESCRIPTION OF THE PREFERRED EMBODIMENT

Figure 1:
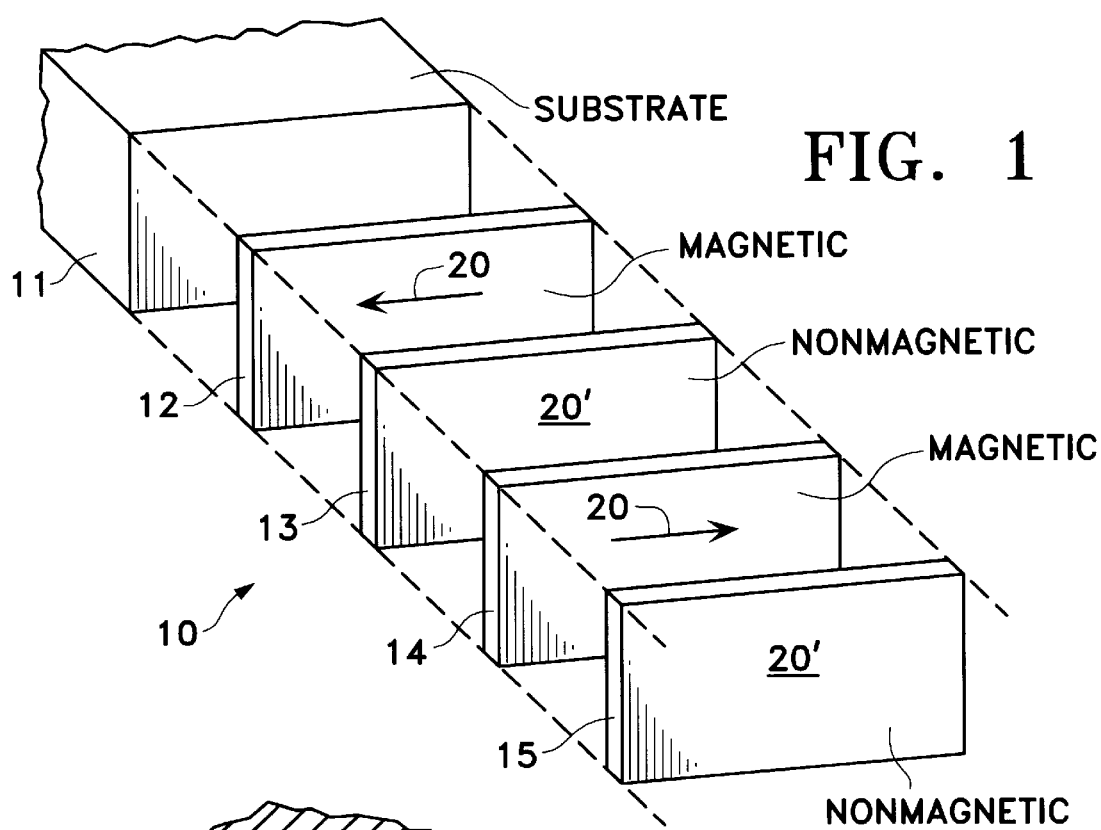
FIG. 1 is an exploded isometric view showing the alternating layers of ferromagnetic and nonmagnetic material which are combined to produce the structure of this invention.

Referring to FIG. 1, numeral 11 designates a substrate on which the structure of the GMR sensing element 10 may be fabricated. This structure includes layers of ferromagnetic material 12 and 14 interleaved with layers 13 and 15 of nonmagnetic material. Ferromagnetic layers 12, 14 may be of any suitable material such as NiFe or Co, and nonmagnetic layers 13, 15 are preferably copper. Although FIG. 1 shows two ferromagnetic layers and two nonmagnetic layers, it will be understood that any suitable number of such pairs of alternating layers may be employed.

The assembled film is then etched to form a rectangular shape. The magnetization of layers 12, 13, 14, 15 is coupled by magnetostatic interactions between the layers and by any exchange interactions therebetween, to provide an antiparallel orientation between adjacent magnetic layers separated by nonmagnetic layers 20'. The magnetization in the absence of a biasing magnet, where the preferred direction is parallel to the long axis of the rectangle, is represented by oppositely directed arrows 20.

Figure 2:
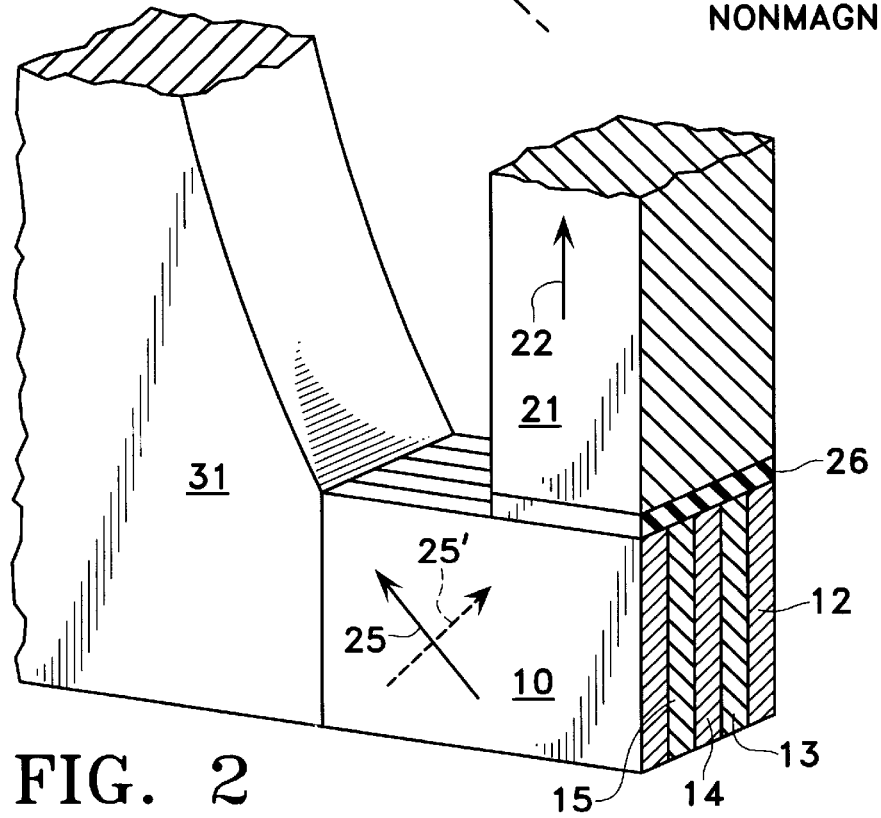
FIG. 2 is an isometric cross-sectional view illustrating the assembly of the alternating ferromagnetic and nonmagnetic layers, the permanent magnet bias member and conductive leads connected to the ferromagnetic/nonconductive layers.

A shown in FIG. 2, a magnetic biasing means is formed at right angles to the trackwidth direction of sensor 10. Such biasing means may be in the form of a permanent magnet 21, which when initialized along the direction represented by arrow 22 in FIG. 2, provides the biased state for the multilayer film. In this state, the magnetization directions in alternate layers 12, 14 forming the sensor element are approximately at right angles to each other in a scissored state, as represented by orthogonal arrows 25, 25'. A thin spacer layer 26 of nonmagnetic, electrically nonconductive material, such as $Al_2O_3$, blocks any exchange interactions between the multilayer sensor element and permanent magnet 21. Permanent magnet 21 and spacer layer 26 are bonded to alternating layers 12, 13, 14, 15 by a contiguous junction. Such a contiguous junction may be of the type taught in U.S. Pat. No. 5,018,037, Krounbi et al.

As an alternative to permanent magnet 21, it can be replaced by an exchange-coupled antiferromagnetic/ferromagnetic multilayer structure capable of producing free poles at the ends thereof to produce a magnetostatic field on the sensor.

Current carrying leads 31 are then formed to supply electrical current to the GMR element from a sense current source (not shown) for producing an indication of the strength and direction of the sensed magnetic field, as is known in the art. Leads 31 can be connected to the sensor either by overlaying the leads on the edges of the sensor element, or by forming an abutted junction with the ends of the sensor element as shown in FIG. 2. Leads 31 are formed to provide a contiguous junction with the ends of alternating layers 12, 13, 14, 15. This structure results in a flow of current-in-the-plane (CIP) of layers 12, 13, 14, 15. The sensor can be fabricated with a magnetic shield on each side which are insulated from the sensor element by electrical insulation to improve the sensor resolution, as is well known in the art.

Figure 3A:
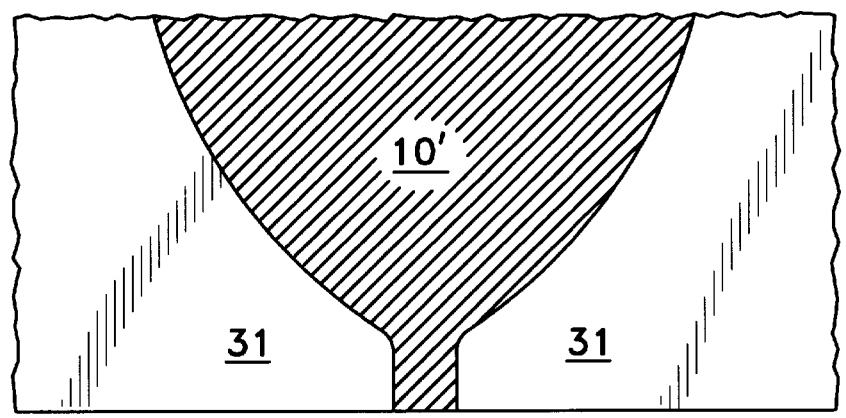
FIGS. 3A–3C are plan views illustrating a sequence of steps in fabricating an alternate embodiment of the invention.
Figure 3B:
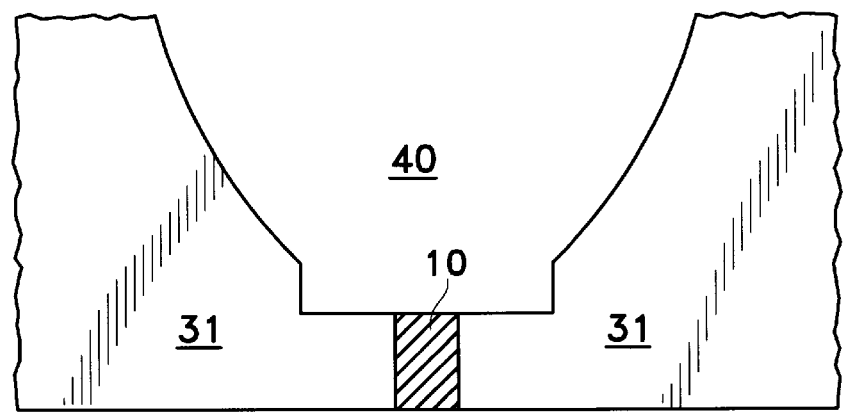
Figure 3C:
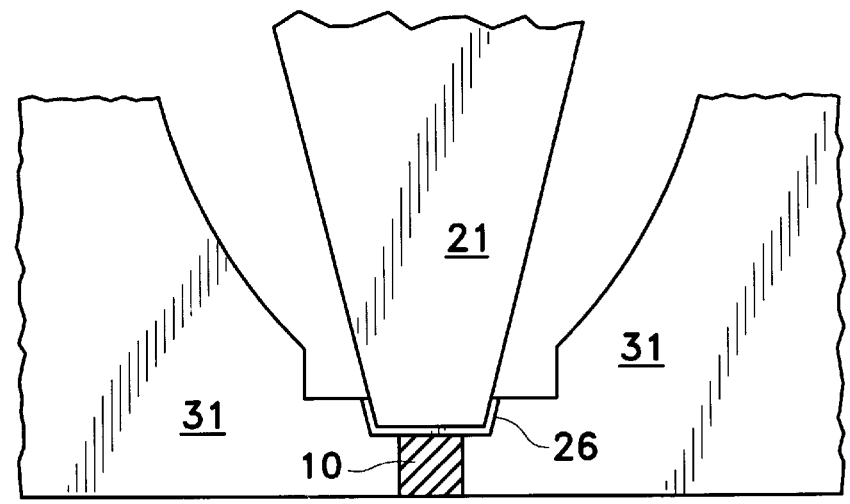

To reduce the effect of current shunting through permanent magnet 21 (which is typically an electrical conductor), the structure shape can be changed as shown in FIGS. 3A, 3B and 3C. First, a sheet film 10' of the multilayer sensor structure is deposited. Next, as shown in FIG. 3A, the leads 31 are formed in a contiguous junction with the sides of the sensor element structure 10'. This removes the sensor element material under the leads, thereby defining the track width. As shown in FIG. 3B, portions of leads 31 and sensor material 10' are then masked off, and the exposed areas are etched to remove all metal therein in the area 40. This leaves a flat surface on the top of the remainder of sensor material 10 and on the portions of lead structure 31, which are in contiguous junction with the sides of sensor element 10. This produces a GMR structure having a CIP current flow, as in the embodiment of FIG. 2.

Then, as shown in FIG. 3C, the surfaces of leads 31 and sensor structure 10 are shaped by etching or other suitable technique to produce shoulder portions in leads 31. Following this, permanent magnet 21 is formed in a contiguous junction relationship with the lead structure 31 and the sensor element structure 10, with a thin layer 26 (100 to 400 Å) of a nonmagnetic, nonconductive material at the junctions between permanent magnet 21, sensor element 10 and leads 31.

What is claimed is:

1. A magnetic thin film transducer for detecting flux transitions in a magnetic recording medium having magnetically oriented regions therein comprising:

a current-in-plane giant magnetoresistive sensing structure for sensing the magnetically oriented regions in the medium;

said giant magnetoresistive sensing structure including alternating layers of ferromagnetic and nonmagnetic material which are coupled to each other by magnetostatic interactions, said layers having edges along the periphery of said sensing structure, the edges along one side of the periphery and the edges along the opposing side of the periphery having the same total width;

a single permanent magnet disposed above an upper peripheral side of said magnetoresistive sensing structure, said upper peripheral side being perpendicular to said one side and said opposing side of the periphery, said permanent magnet being magnetically coupled to said layers of said magnetoresistive sensing structure for generating a magnetic bias field in said sensing structure;

a single nonmagnetic and electrically nonconductive spacer layer disposed between said magnetoresistive sensing structure and said permanent magnet; and electrical conductors in contact with said magnetoresistive sensing structure and spaced from said permanent magnet and forming contiguous junctions along the entire width of said one side and said opposing side of the periphery of said magnetoresistive sensing structure.

2. A thin film transducer in accordance with claim 1 in which said spacer layer is joined to said magnetoresistive sensing structure by a contiguous junction.

3. A thin film transducer in accordance with claim 2 in which said spacer layer is $Al_2O_3$.

4. A thin film transducer in accordance with claim 1 in which said ferromagnetic material is NiFe or Co and said nonmagnetic material is Cu.

* * * * *